United States Patent
Hong et al.

(10) Patent No.: US 8,330,911 B2
(45) Date of Patent: Dec. 11, 2012

(54) WIDE-ACCEPTANCE-ANGLE CIRCULAR POLARIZERS

(75) Inventors: Qi Hong, Orlando, FL (US); Ruibo Lu, Orlando, FL (US); Xinyu Zhu, Orlando, FL (US); Thomas X. Wu, Oviedo, FL (US); Shin-Tson Wu, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 461 days.

(21) Appl. No.: 12/148,491

(22) Filed: Apr. 18, 2008

(65) Prior Publication Data

US 2008/0239490 A1 Oct. 2, 2008

Related U.S. Application Data

(62) Division of application No. 11/167,857, filed on Jun. 27, 2005, now abandoned.

(51) Int. Cl.
*G02F 1/1335* (2006.01)
*G02B 5/30* (2006.01)

(52) U.S. Cl. ..... 349/117; 349/98; 349/119; 359/489.07; 359/489.13; 359/489.15

(58) Field of Classification Search .............. 349/96–98, 349/117–121; 359/489.07, 489.13, 489.15
See application file for complete search history.

(56) References Cited

U.S. PATENT DOCUMENTS

| | | | |
|---|---|---|---|
| 4,156,213 A | 5/1979 | Shindo et al. | |
| 5,796,454 A | 8/1998 | Ma | |
| 5,895,106 A * | 4/1999 | VanderPloeg et al. | 349/120 |
| 6,219,139 B1 | 4/2001 | Lesniak | |
| 6,403,223 B1 | 6/2002 | Albro et al. | |
| 6,549,335 B1 | 4/2003 | Trapani et al. | |
| 6,583,833 B1 | 6/2003 | Kashima | |
| 6,606,193 B2 * | 8/2003 | Umemoto | 359/487.02 |
| 6,628,369 B2 | 9/2003 | Kumagai et al. | |
| 6,788,462 B2 | 9/2004 | Lesniak | |
| 2004/0109114 A1 | 6/2004 | Takeuchi et al. | |
| 2004/0233362 A1 * | 11/2004 | Kashima | 349/117 |
| 2005/0140900 A1 * | 6/2005 | Jeon et al. | 349/141 |
| 2005/0200776 A1 * | 9/2005 | Hara et al. | 349/98 |
| 2005/0200792 A1 * | 9/2005 | Jeon et al. | 349/141 |
| 2006/0033850 A1 | 2/2006 | Skjonnemand | |
| 2006/0132686 A1 * | 6/2006 | Jeon et al. | 349/117 |

* cited by examiner

*Primary Examiner* — Mark Robinson
*Assistant Examiner* — Charles Chang
(74) *Attorney, Agent, or Firm* — Brian S. Steinberger; Phyllis K. Wood; Law Offices of Brian S. Steinberger, P.A.

(57) ABSTRACT

A circular polarizer comprising a single linear polarizer producing a linear state of polarization and at least one phase retardation film layered with the single linear polarizer. In a first embodiment, the at least one phase retardation film includes at least one uniaxial A-plate phase retardation film and at least one uniaxial C-plate phase retardation film. In a second embodiment of the invention, the circular polarizer includes a linear polarizer and at least one biaxial phase retardation film layered with the linear polarizer. In another example of the circular polarize of the second embodiment, at least one uniaxial A-plate phase retardation film and/or at least one uniaxial C-plate phase retardation film is also layer with the linear polarize and the biaxial phase retardation film.

2 Claims, 11 Drawing Sheets

WIDE-ACCEPTANCE-ANGLE CIRCULAR POLARIZERS

This application is a divisional application of U.S. patent application Ser. No. 11/167,857 filed on Jun. 27, 2005 now abandoned.

FIELD OF THE INVENTION

This invention relates to circular polarizers, and more specifically, to the structure of circular polarizer with combinations of multi-layer phase retardation films to provide left-hand or right-hand circularly polarized light at wide-range of incident angle and at all azimuth of incident plane for a single wavelength or broadband light source for applications including liquid crystal displays, fiber optics, and optical remote sensors.

BACKGROUND AND PRIOR ART

Circular polarizers are an important optical component in many applications, such as fiber optics, imaging lenses, and liquid crystal displays, especially in the applications when the state of polarization is desired to be independent of the azimuthal angle of the incident light, or to be independent of the azimuthal angle of the slow axis of anisotropic media. Circular polarizer can be used in the studies of the properties of thin films, as described in to U.S. Pat. No. 6,219,139 issued to Lesniak on Apr. 17, 2001. Circular polarizers are also used in Liquid crystal displays (LCDs), as described in U.S. Pat. No. 6,549,335 B1 issued to Trapani et al. on Apr. 15, 2003, U.S. Pat. No. 6,583,833 B1 issued to Kashima on Jun. 24, 2003, U.S. Pat. No. 5,796,454 issued to Ma on Aug. 18, 1998, and U.S. Pat. No. 6,628,369 B2 issued to Kamagal on September, 2003.

Circularly polarized light is a polarized plane light with equal magnitude in its orthogonal components and the phase difference between the orthogonal components is $\pm\pi/2$. Circularly polarized light can be generated by cholesteric liquid crystal, according to U.S. Pat. No. 5,796,454, or can be converted from linearly polarized light with a linear polarizer and a quarter-wave plate, of which the principal optical axes is 45 degrees with respect to the transmission axis of the linear polarizer, according to U.S. Pat. No. 6,788,462 B2 issued to Lesniak on Sep. 7, 2004. According to U.S. Pub. No. 2004/0109114 A1 filed on Jun. 10, 2004, a circularly polarized light can also be converted from a linearly polarized light with a substrate having a longitudinal direction and the combination of a half-wave plate and a quarter-wave plate, where the principal optical axes of the half-wave plate and the quarter-wave plate are +30 and −30 degrees with respect to the longitudinal direction of the substrate, respectively. A quarter-wave plate is an optical anisotropic element which induces $\pi/2$ phase difference between the orthogonal components of the light passing through. A half-wave plate is an optical anisotropic element which induces $\pi$ phase difference between the orthogonal components of the light passing through.

However, when cholesteric liquid crystal is used, the induced circularly polarized light sustains blue shift at oblique incident angle. Furthermore, the fabrication of cholesteric liquid crystal cell is difficult. When the combination of a linear polarizer and a quarter-wave plate or using the combination of special substrates having a longitudinal direction and a half-wave plate together with a quarter-wave plate, the quarter-wave plate or half-wave plate only induces $\pi/2$ or $\pi$ phase change at normal incident angle. At oblique incident angles, the phase change is varied with both incident angle and the azimuth of incident plane, which results in elliptically polarized light instead of the desired circularly polarized light.

FIG. 1 shows the structure of a conventional right-hand circular polarizer comprising one linear polarizer and one quarter-wave plate. Along the propagation direction of the incident light, the structure comprises one linear polarizer 101, and one quarter-wave phase retardation film 102. As shown in FIG. 2, at 85° incident angle and 45° azimuth of incident plane, the $S_3$ of the state of polarization emerging from such a conventional circular polarizer is −0.829. However, the $S_3$ of the desired right-hand circular state of polarization is −1. Therefore, the difference between the $S_3$ of the desired circular state of polarization and the $S_3$ of the state of polarization emerging from the conventional circular polarizer is 0.171 at 85° incident angle and at 45° azimuth of the incident plane. As a result, the optical performance for those applications having a wide range of incident angles is greatly deteriorated. For example, in a liquid crystal display, the non-ideal circular state of polarization emerging from conventional circular polarizer reduces the contrast ratio of the LCD at wide incident angles. Therefore, a need exists for a wide-acceptance-angle circular polarize for use in these applications.

SUMMARY OF THE INVENTION

A primary objective of this invention is to provide a new method, system, apparatus and device for a circular polarizer capable of inducing left-hand or right-hand circularly polarized light over wide ranges of incident angle and over all azimuths of incident plane.

A secondary objective of this invention is to provide a new method, system, apparatus and device for a wide-acceptance-angle circular polarizer that inducing left-hand or right-hand circularly polarized light either on the output surface of the circular polarizer or inside arbitrary media including air.

A third objective of this invention is to provide a new method, system, apparatus and device for a wide-acceptance-angle circular polarizer with achromatic behavior.

A fourth objective of this invention is to provide a new method, system, apparatus and device for a wide-acceptance-angle circular polarizer with a large error tolerance in the phase retardation of the phase retardation films.

A fifth objective of this invention is to provide a new method, system, apparatus and device for a wide-acceptance-angle circular polarizer with a large error tolerance in the angles between the absorption axis of the linear polarizer and the slow axes of the phase retardation films.

A sixth objective of this invention is to provide a wide-acceptance-angle circular polarizer at a low cost.

A first preferred embodiment of the invention is to provide a structure of a wide-acceptance angle left-hand or right-hand circular polarizer comprising a single linear polarizer producing a linear state of polarization and at least one phase retardation film layered with the single linear polarizer. In a first embodiment, the at least one phase retardation film includes at least one uniaxial A-plate phase retardation film and at least one uniaxial C-plate phase retardation film.

In a second embodiment of the invention, the left-hand or right-hand circular polarizer includes a linear polarizer and at least one biaxial phase retardation film layer with the linear polarizer. In another example of the circular polarize of the second embodiment, at least one phase retardation is layer with the linear polarize and the biaxial phase retardation film.

Further objectives, features, and advantages of this invention will be apparent from the following detailed descriptions of the presently preferred embodiments that are illustrated schematically in the accompanying drawings.

DESCRIPTION OF THE PREFERRED EMBODIMENTS

Figure 1:
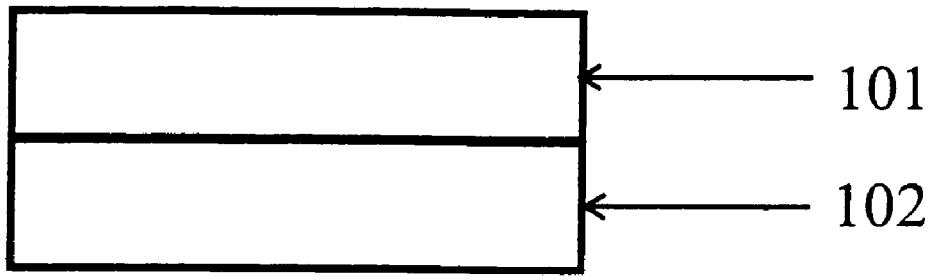
FIG. 1 is a schematic diagram showing an example of conventional prior art circular polarizer.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 101 | linear polarizer |
| 102 | quarter-wave phase retardation film |
| 301 | linear polarizer |
| 302 | A-plate phase retardation film |
| 303 | C-plate phase retardation film |
| 501 | linear polarizer |
| 502a | A-plate phase retardation film |
| 502b | A-plate phase retardation film |
| 503 | C-plate phase retardation film |
| 701 | linear polarizer |
| 702a | A-plate phase retardation film |
| 702b | A-plate phase retardation film |
| 702c | A-plate phase retardation film |
| 703a | C-plate phase retardation film |
| 703b | C-plate phase retardation film |
| 901 | linear polarizer |
| 902a | A-plate phase retardation film |
| 902b | A-plate phase retardation film |
| 902c | A-plate phase retardation film |
| 902d | A-plate phase retardation film |
| 902e | A-plate phase retardation film |
| 903a | C-plate phase retardation film |
| 903b | C-plate phase retardation film |
| 903c | C-plate phase retardation film |
| 1101 | linear polarizer |
| 1102 | biaxial phase retardation film |
| 1201 | linear polarizer |
| 1202a | biaxial phase retardation film |
| 1202b | biaxial phase retardation film |
| 1301 | linear polarizer |
| 1302 | A-plate phase retardation film |
| 1303 | biaxial phase retardation film |
| 1401 | linear polarizer |
| 1402 | C-plate phase retardation film |
| 1403 | biaxial phase retardation film |
| 1501 | linear polarizer |
| 1502 | A-plate phase retardation film |
| 1503 | C-plate phase retardation film |
| 1504 | biaxial phase retardation film |
| 1601 | linear polarizer |
| 1602a | A-plate phase retardation film |
| 1602b | A-plate phase retardation film |
| 1603a | C-plate phase retardation film |
| 1603b | C-plate phase retardation film |
| 1604a | biaxial phase retardation film |
| 1604b | biaxial phase retardation film |

The method, system apparatus and device of the present invention provides a new device structure for producing left-hand or right-hand circular state of polarization over wide-range of incident angle and all azimuth of incident plane using the combinations of linear polarizer and multi-layer phase retardation films.

Figure 2:
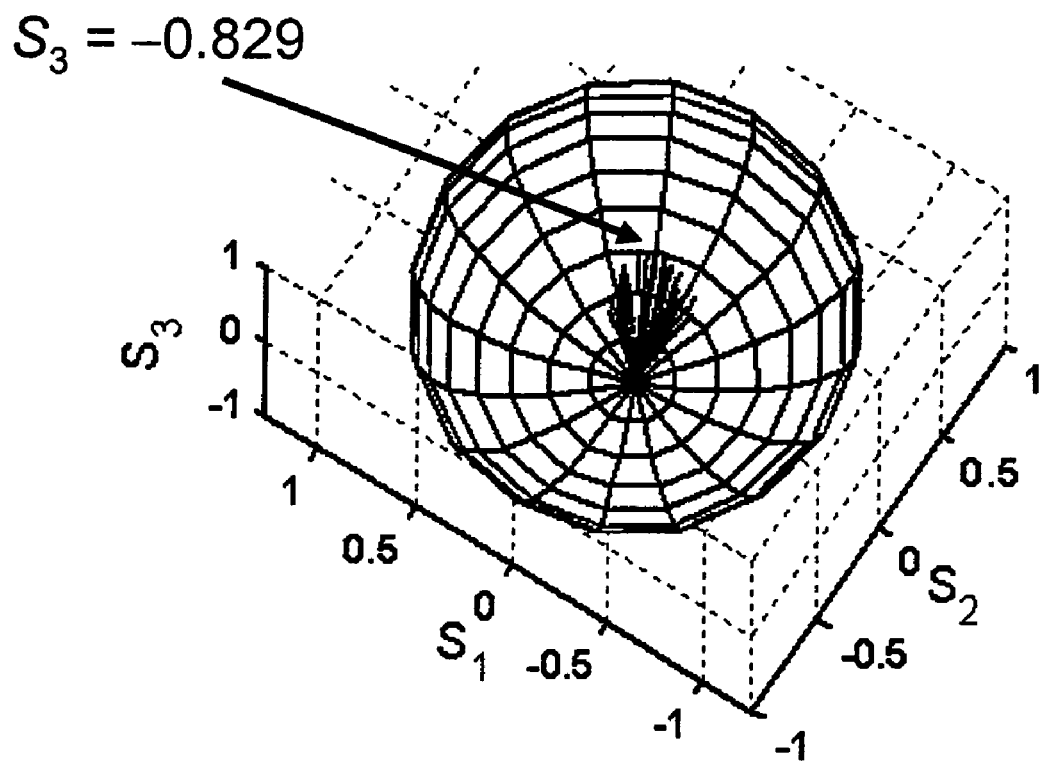
FIG. 2 is a schematic diagram showing the state of polarization emerging from the circular polarizer illustrated in FIG. 1.

The state of polarization can be represented by Stokes parameters and plotted on Poincaré sphere. FIG. 2 is a plot showing the state of polarization emerging from the circular polarizer illustrated in FIG. 1. The incident angle is 0°~85° and the azimuth of incident plane is 0°~360° with respect to the transmission axis of polarizer. Stokes parameters $S_1$, $S_2$, $S_3$ are defined as:

$$S_1 = (|E_\parallel|^2 - |E_\perp|^2)/(|E_\perp|^2 + |E_\parallel|^2),$$

$$S_2 = (2 \cdot |E_\perp|^2 \cdot |E_\parallel|^2 \cdot \cos\phi)/(|E_\perp|^2 + |E_\parallel|^2),$$

$$S_3 = (2 \cdot |E_\perp|^2 \cdot |E_\parallel|^2 \cdot \sin\phi)/(|E_\perp|^2 + |E_\parallel|^2),$$

where $E_\parallel$ and $E_\perp$ are the parallel and perpendicular components of the incident electrical field, respectively. $\phi$ is given by: $\phi = \angle E_\perp - \angle E_\parallel$, where $\angle E_\parallel$ and $\angle E_\perp$ are the phases of the parallel and perpendicular components of the incident electrical field, respectively.

The circular polarizer of the present invention includes a linear polarizer and at least one phase retardation film layer with the linear polarizer for achieving a state of polarization that is closer to a left-hand ($S_3$ approximately equal to 1) or right-hand circular state of polarization ($S_3$ approximately equal to −1) than that of a convention prior art circular polarizer.

First Embodiment

Figure 3:
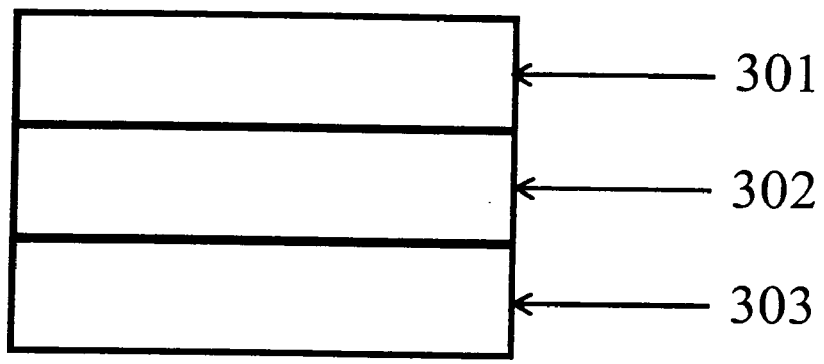
FIG. 3 shows an example of the circular polarizer structure according to a first embodiment of the present invention.

FIG. 3 shows the structure of wide-acceptance-angle circular polarizer consisting of one uniaxial A-plate phase retardation film and one uniaxial C-plate phase retardation film according to the first preferred embodiment. A uniaxial A-plate phase retardation film is an optical component that is made of uniaxial anisotropic media with its optical axis parallel to the polarizer-retarder surface and a uniaxial C-plate phase retardation film is an optical component that is made of uniaxial anisotropic media with its optical axis perpendicular to the polarizer-retarder surface.

In an example of the first embodiment shown in FIG. 3, the structure comprises optical components along the propagation direction of the incident light, beginning with a polarizing film 301 producing linear state of polarization, followed by the combination of one uniaxial A-plate phase retardation film 302 and one uniaxial C-plate phase retardation film 303.

The displacements of the uniaxial A-plate phase retardation film 301 and the uniaxial C-plate phase retardation film 302 can be in any order along the propagation direction of the incident light. For the uniaxial A-plate phase retardation film 302, the slow axis is approximately $\pm(30°\sim60°)$ with respect to the transmission direction of the linear polarizer and the phase retardation satisfies condition $d\cdot\Delta n=\pm(0.2\lambda\sim3.5\lambda)$, where $\lambda$ is the incident light wavelength. For the uniaxial C-plate phase retardation film 303, the phase retardation satisfies condition $d\cdot\Delta n=\pm(0.05\lambda\sim3.5\lambda)$. In the normal incident case, the phase retardation of the uniaxial C-plate phase retardation film is zero.

The emerging state of polarization depends on the phase retardation of the uniaxial A-plate phase retardation film and the angle between the slow axis of the uniaxial A-plate phase retardation film and the transmission axis of polarizer. In the oblique incident case, the phase retardation of the uniaxial C-plate phase retardation film is nonzero, which reduces the difference between the expected circular state of polarization and the state of polarization emerging from the uniaxial A-plate phase retardation film.

Figure 4A:
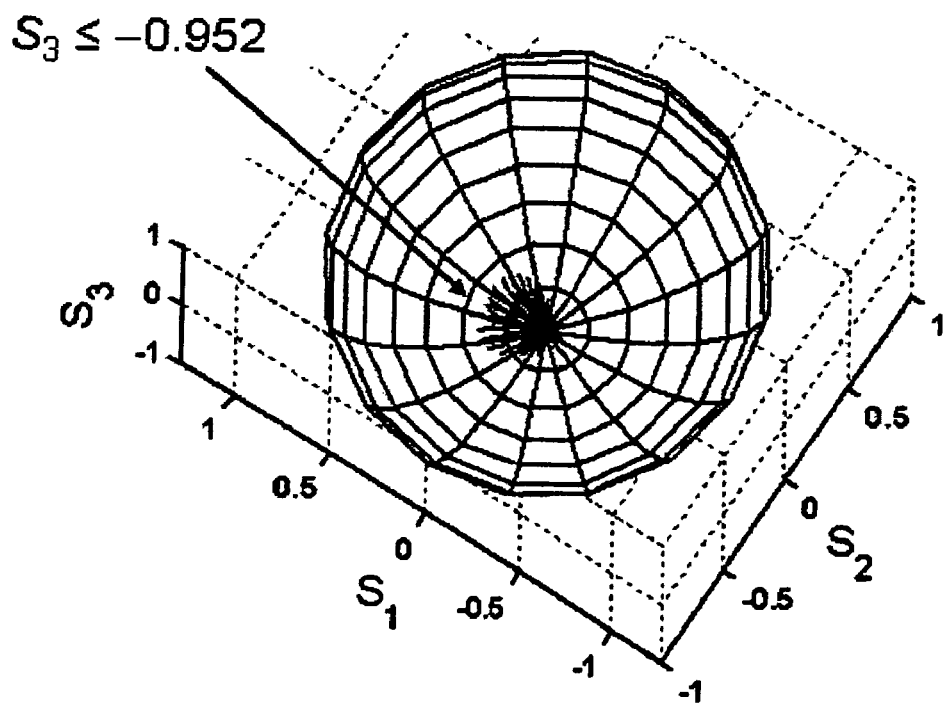
FIG. 4a shows the state of polarization emerging from the right-handed circular polarizer illustrated in FIG. 3.
Figure 4B:
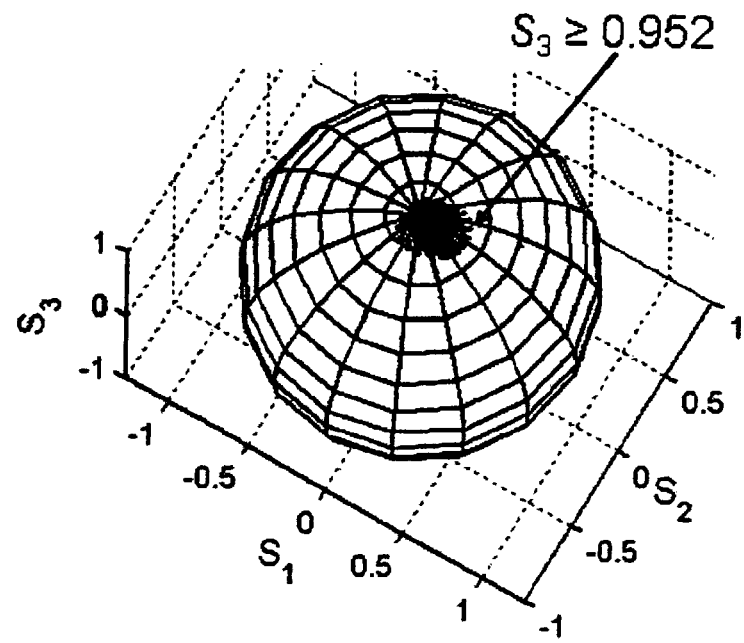
FIG. 4b shows the state of polarization emerging from the left-handed circular polarizer illustrated in FIG. 3

When the structure in FIG. 3 induces right-handed circular state of polarization, the state of polarization emerging from the structure is shown in FIG. 4a using Poincaré sphere when the linear polarizer is modeled as uniaxial absorptive material, of which the refractive indices $n_e=1.5+i\times3.251\times10^{-3}$ and $n_o=1.5+i\times2.86\times10^{-3}$. The structure in FIG. 3 may also be used to induce a left-handed state of polarization as shown in FIG. 4b. For the left-handed circular polarizer, the slow axis of the uniaxial A-plate films is negative of that of the A-plate films in the right-handed circular polarizer shown in FIG. 3. The incident angle is between 0°~85° and the azimuth of incident plane is between approximately 0° and approximately 360° with respect to the transmission axis of the polarizer. The difference between the $S_3$ of the expected circular state of polarization and the $S_3$ of the state of polarization emerging from the structure is less than 0.05 over 0°~85° incident angle and 0°~360° azimuth of incident plane. Compared with the state of polarization emerging from conventional circular polarizer as shown in FIG. 2, the difference between the expected circular state of polarization and the produced state of polarization emerging from the structure shown in FIG. 3 is greatly reduced. Furthermore, the structure has the advantages of simple structure, easy fabrication and low cost.

Figure 5:
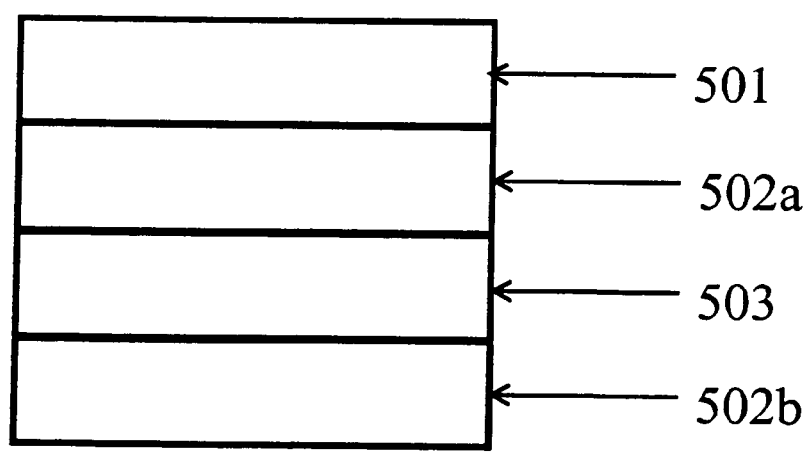
FIG. 5 shows another example of the circular polarizer structure according to the first embodiment of the present invention.

FIG. 5 shows another example of the structure of the wide-acceptance-angle circular polarizer in which a second uniaxial A-plate retardation is included. In this example, the wide-acceptance-angle circular polarizer includes optical components along the propagation direction of the incident light, beginning with a polarizing film producing linear state of polarization 501, followed by two uniaxial A-plate phase retardation films 502a and 502b, and one uniaxial C-plate phase retardation film 503.

The displacements of the uniaxial A-plate phase retardation films and the uniaxial C-plate phase retardation film can be in any order along the propagation direction of the incident light. For the uniaxial A-plate phase retardation film 502a, the slow axis is $\pm(5°\sim45°)$ with respect to the transmission direction of the linear polarizer and the phase retardation satisfies condition $d\cdot\Delta n=\pm(0.05\lambda\sim3.5\lambda)$. For the uniaxial C-plate phase retardation film 503, the phase retardation satisfies condition $d\cdot\Delta n=\pm(0.05\lambda\sim3.5\lambda)$. For the uniaxial A-plate phase retardation film 502b, the slow axis is $\pm(45°\sim85°)$ with respect to the transmission direction of the linear polarizer and the phase retardation satisfies condition $d\cdot\Delta n=\pm(0.05\lambda\sim3.5\lambda)$. In the normal incident case, the phase retardation of the uniaxial C-plate phase retardation film is zero.

The emerging state of polarization depends on the phase retardations of the uniaxial A-plate phase retardation films and the angles between the slow axes of the uniaxial A-plate phase retardation films and the transmission axis of polarizer. In the oblique incident case, the difference between the expected circular state of polarization and the state of polarization emerging from the structure is reduced by the phase retardations of the uniaxial C-plate phase retardation film and the two uniaxial A-plate phase retardation films.

Figure 6A:
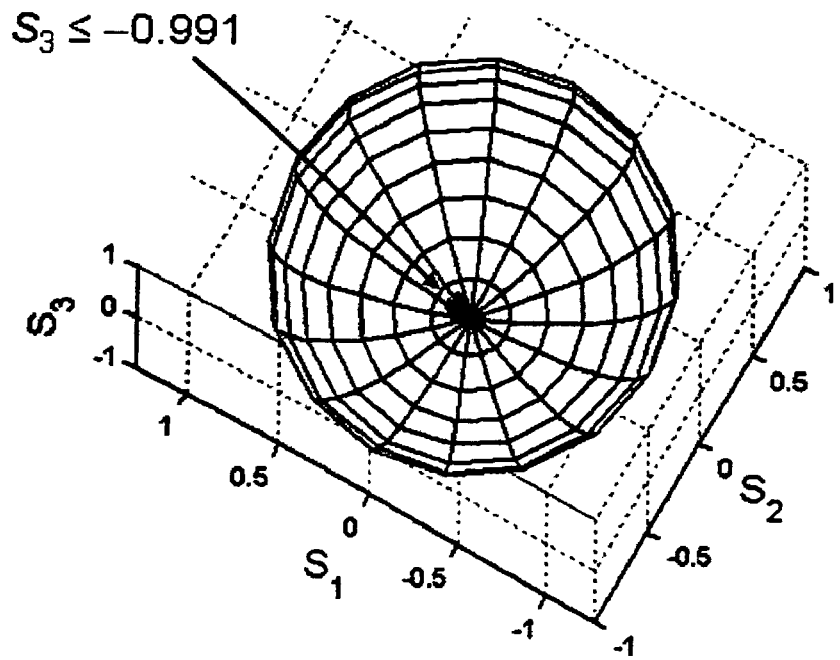
FIG. 6a shows the state of polarization emerging from the right-handed circular polarizer illustrated in FIG. 5.
Figure 6B:
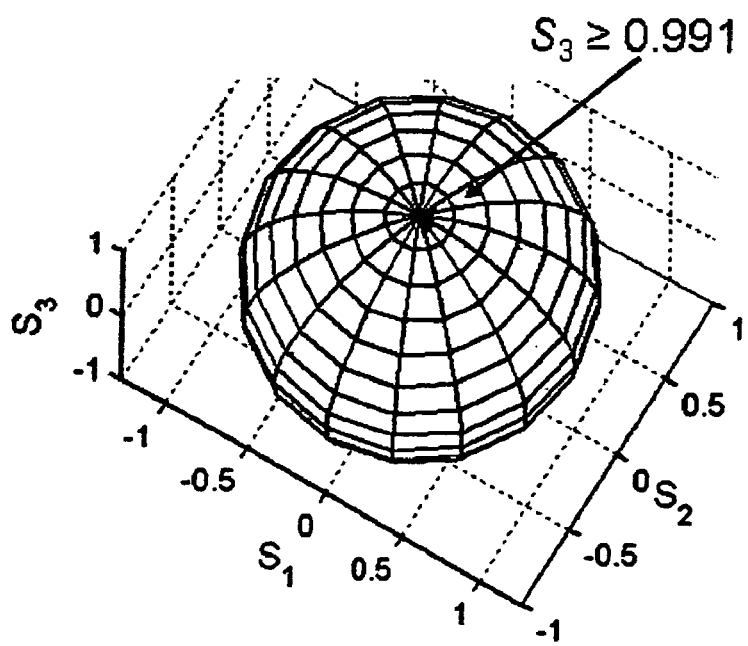
FIG. 6b shows the state of polarization emerging from the left-handed circular polarizer illustrated in FIG. 5.

The structure in FIG. 5 can induce right-handed circular state of polarization, FIG. 6a shows the state of polarization emerging from the structure using Poincaré sphere when the linear polarizer is modeled as a uniaxial absorptive material, of which the refractive indices $n_e=1.5+i\times3.251\times10^{-3}$ and $n_o=1.5+i\times2.86\times10^{-3}$. The structure in FIG. 5 is applicable to left-hand circular polarizer as FIG. 6b shows. For the left-handed circular polarizer, the slow axis of the uniaxial A-plate films is negative of that of the A-plate films in the right-handed circular polarizer in FIG. 5. The incident angle is between approximately 0° and approximately 85° and the azimuth of incident plane is approximately 0° and approximately 360° with respect to the transmission axis of polarizer. The difference between the $S_3$ of the expected circular state of polarization and the $S_3$ of the state of polarization emerging from the structure is less than 0.008 over the 0° to approximately 85° incident angle and 0° to approximately 360° azimuth of incident plane. Comparing with the proposed wide-incident-angel circular polarizer shown in FIG. 3, the difference between the expected circular state of polarization and the produced state of polarization emerging from the structure shown in FIG. 5 is further reduced.

Figure 7:
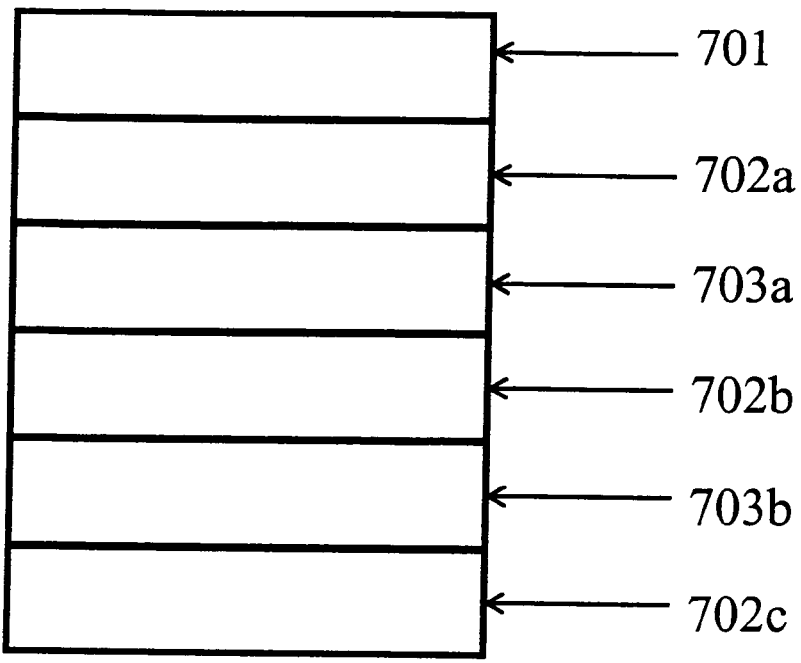
FIG. 7 shows another example of the circular polarizer structure according to the first embodiment of the present invention.

In another example of the first embodiment shown in FIG. 7, the structure of the wide-acceptance-angle circular polarizer includes a third uniaxial A-plate phase retardation films and a second uniaxial C-plate phase retardation films. The structure comprises optical components along the propagation direction of the incident light, beginning with a polarizing film 701 producing linear state of polarization, followed by three uniaxial A-plate phase retardation films 702a, 702b and 702c, and two uniaxial C-plate phase retardation films 703a and 703b.

The displacements of the uniaxial A-plate phase retardation films and the uniaxial C-plate phase retardation films can be in any order along the propagation direction of the incident light. For the uniaxial A-plate phase retardation film 702a, the slow axis is approximately ±(0°~85°) with respect to the transmission direction of the linear polarizer and the phase retardation satisfies condition d·Δn=±(0.05λ~3.5λ). For the uniaxial C-plate phase retardation film 703a, the phase retardation satisfies condition d·Δn=±(0.05λ~3.5λ). For the uniaxial A-plate phase retardation film 702b, the slow axis is approximately ±(15°~90°) with respect to the transmission direction of the linear polarizer and the phase retardation satisfies condition d·Δn=±(0.05λ~3.5λ). For the uniaxial C-plate phase retardation film 703b, the phase retardation satisfies condition d·Δn=±(0.05λ~3.5λ). For the uniaxial A-plate phase retardation film 702c, the slow axis is approximately ±(5°~85°) with respect to the transmission direction of the linear polarizer and the phase retardation satisfies condition d·Δn=±(0.05λ~3.5λ). In the normal incident case, the phase retardations of the uniaxial C-plate phase retardation films are zero.

The emerging state of polarization depends on the phase retardations of the uniaxial A-plate phase retardation films and the angles between the slow axes of the uniaxial A-plate phase retardation films and the transmission axis of polarizer. In the oblique incident case, the difference between the expected circular state of polarization and the state of polarization emerging from the structure is reduced by the phase retardations of the uniaxial C-plate phase retardation film and those two uniaxial A-plate phase retardation films.

Figure 8A:
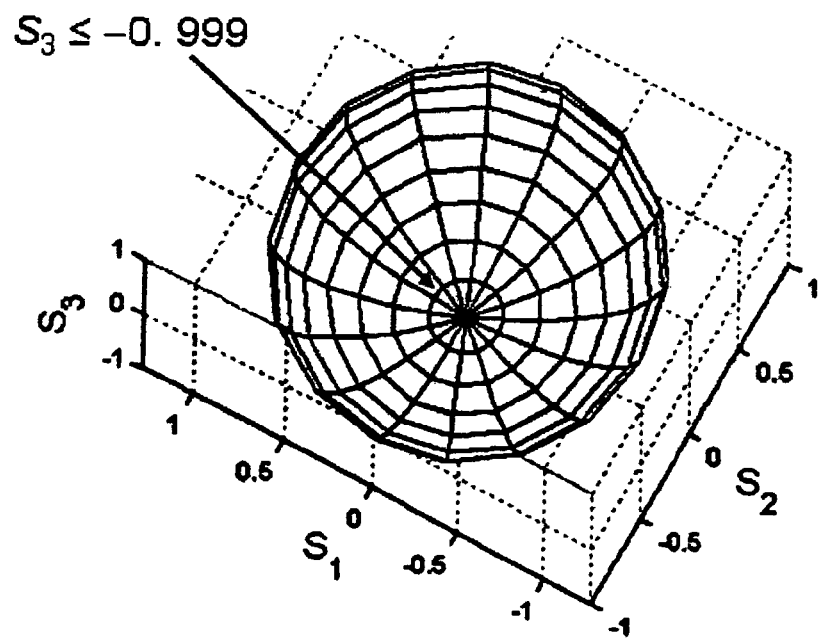
FIG. 8a shows the state of polarization emerging from the right-handed circular polarizer illustrated in FIG. 7.
Figure 8B:
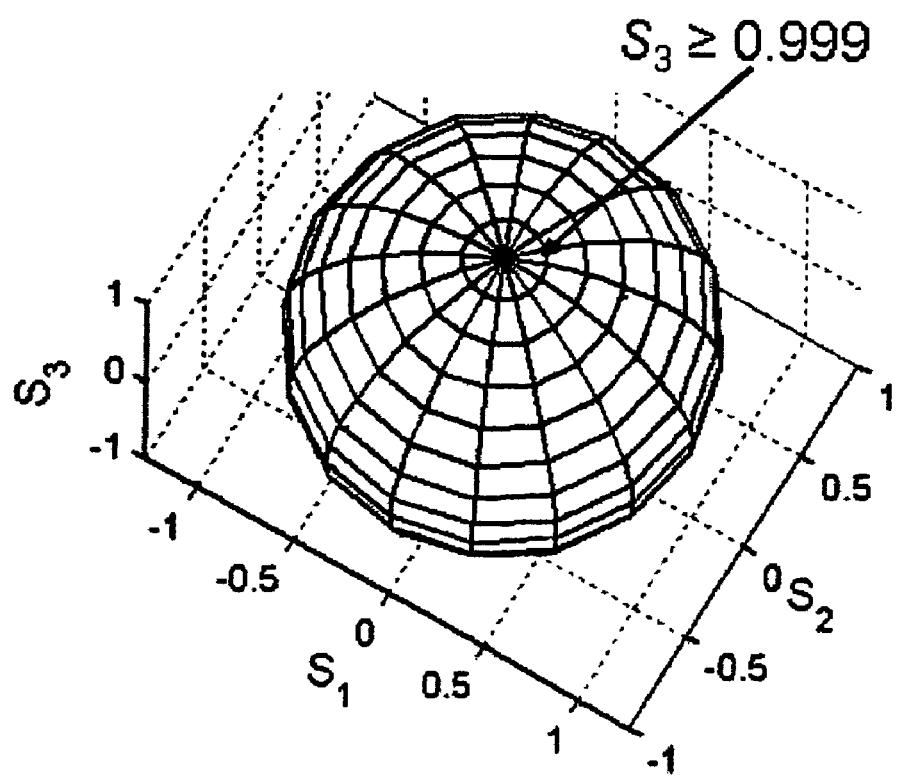
FIG. 8b shows the state of polarization emerging from the left-handed circular polarizer illustrated in FIG. 7.

If the structure in FIG. 7 induces right-hand circular state of polarization, FIG. 8a shows the state of polarization emerging from the structure using Poincaré sphere when the linear polarizer is modeled as a uniaxial absorptive material, of which the refractive indices $n_e=1.5+i\times3.251\times10^{-3}$ and $n_o=1.5+i\times2.86\times10^{-3}$. The structure in FIG. 7 is also applicable to left-hand circular polarizer as shown in FIG. 8b. The incident angle is between approximately 0° and approximately 85° and the azimuth of incident plane is between approximately 0° and approximately 360° with respect to the transmission axis of the polarizer. The difference between the $S_3$ of the expected circular state of polarization and the $S_3$ of the state of polarization emerging from the structure is less than 0.001 over the approximately 0° and approximately 85° incident angle and approximately 0° and approximately 360° azimuth of incident plane. Compared with the proposed wide-acceptance-angel circular polarizers shown in FIG. 3 and FIG. 5, the difference between the expected circular state of polarization and the produced state of polarization emerging from the structure shown in FIG. 7 is further reduced.

Figure 9:
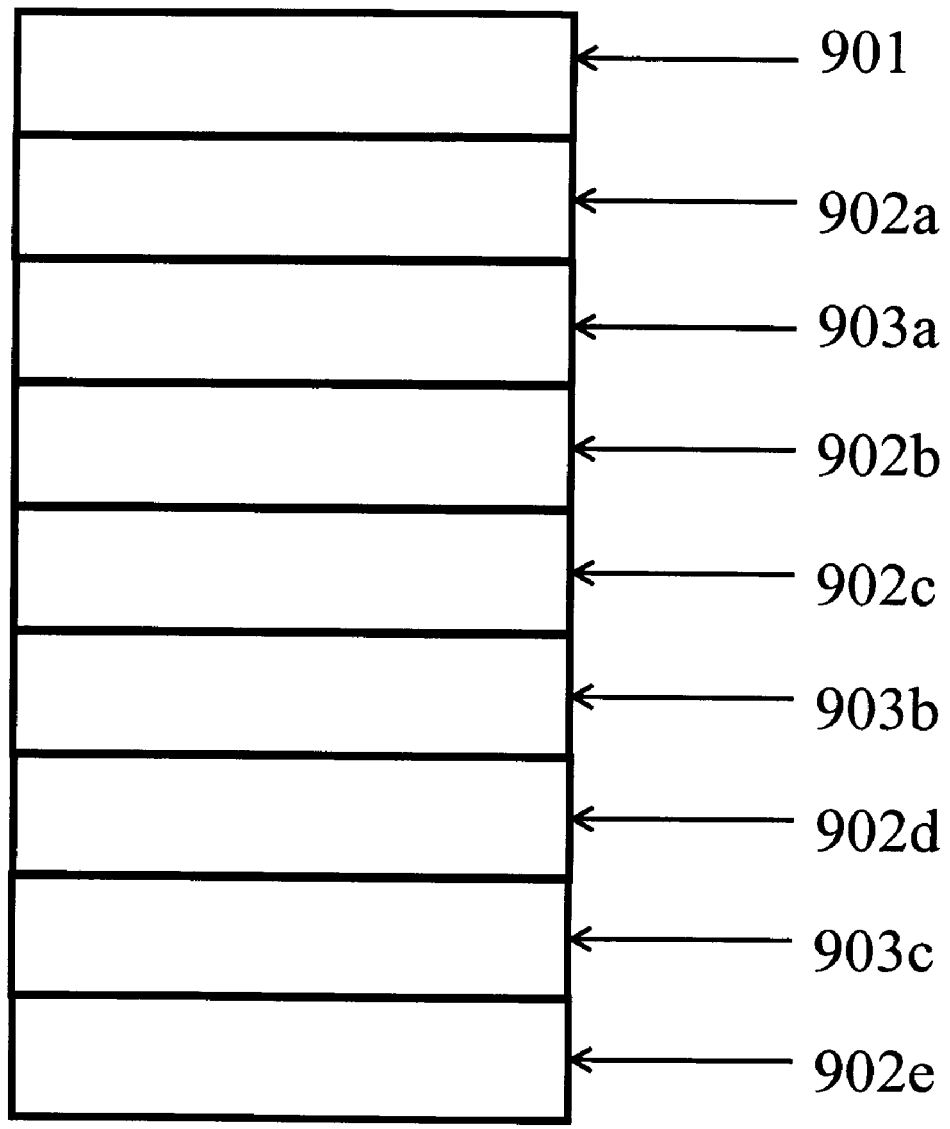
FIG. 9 shows another example of the circular polarizer structure according to the first embodiment of the present invention.

In another example of the first embodiment shown in FIG. 9, the structure of the wide-acceptance-angle circular polarizer includes five uniaxial A-plate phase retardation films and three uniaxial C-plate phase retardation films. The structure comprises optical components along the propagation direction of the incident light, beginning with a polarizing film 901 producing linear state of polarization, followed by five uniaxial A-plate phase retardation films 902a, 902b, 902c, 902d and 902e, and three uniaxial C-plate phase retardation films 903a, 903b and 903c.

The displacements of the uniaxial A-plate phase retardation films and the uniaxial C-plate phase retardation films can be in any order along the propagation direction of the incident light. For the uniaxial A-plate phase retardation films 902a, 902b, 902c, 902c, and 902e, the slow axis is ±(0°~89°) with respect to the transmission direction of the linear polarizer and the phase retardation satisfies condition d·Δn=±(0.05λ~3.5λ). For the uniaxial C-plate phase retardation films 903a, 903b and 903c, the phase retardation satisfies condition d·Δn=±(0.05λ~3.5λ). In the normal incident case, the phase retardations of the uniaxial C-plate phase retardation films are zero.

The emerging state of polarization depends on the phase retardations of the uniaxial A-plate phase retardation films and the angles between the slow axes of the uniaxial A-plate phase retardation films and the transmission axis of polarizer. In the oblique incident case, the difference between the expected circular state of polarization and the state of polarization emerging from the structure is reduced by the phase retardations of the uniaxial C-plate phase retardation film and those two uniaxial A-plate phase retardation films.

Figure 10A:
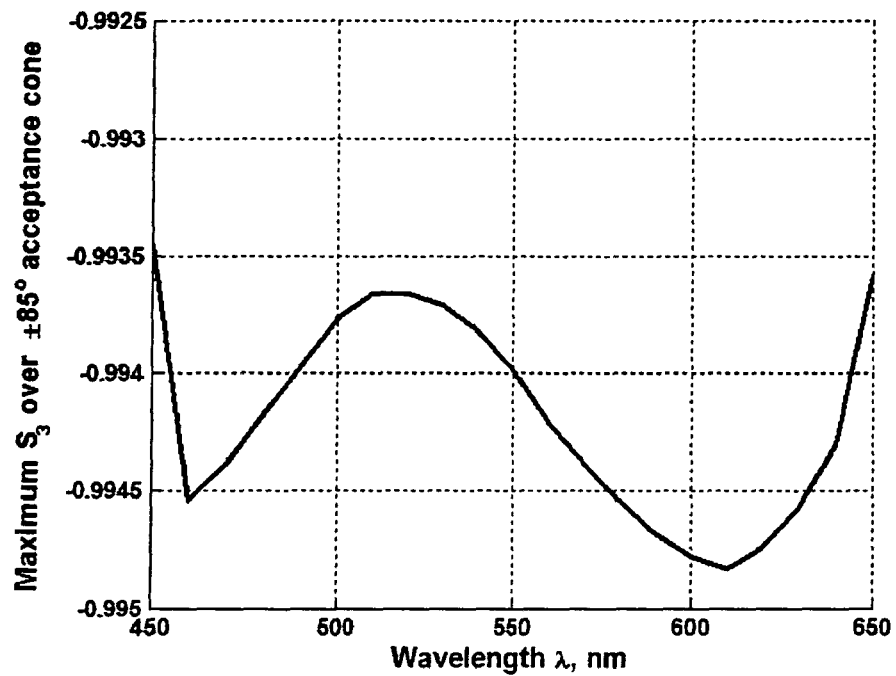
FIG. 10a shows the state of polarization emerging from the right-handed circular polarizer illustrated in FIG. 9.
Figure 10B:
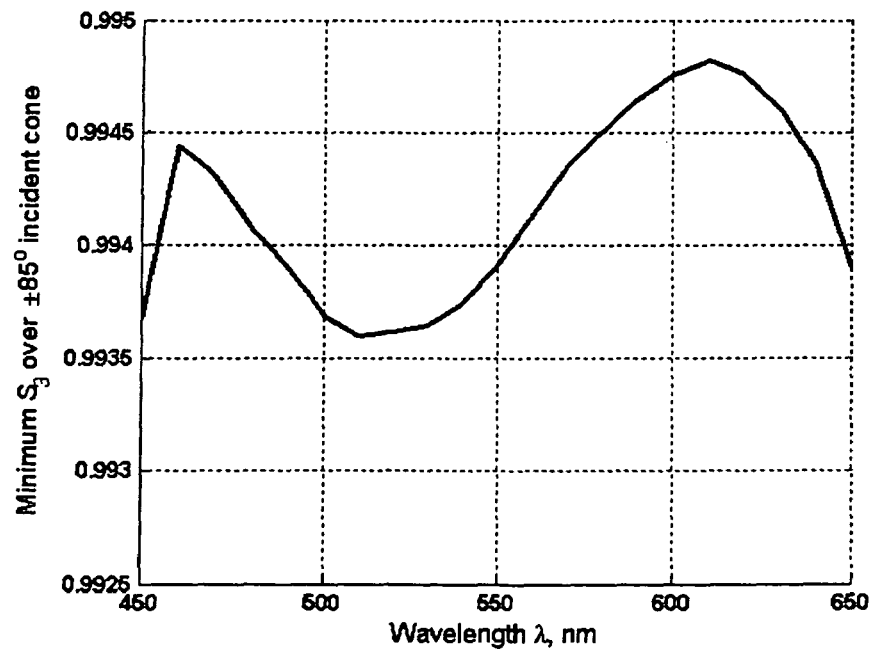
FIG. 10b shows the state of polarization emerging from the left-handed circular polarizer illustrated in FIG. 9.

If the structure in FIG. 9 induces right-hand circular state of polarization, the FIG. 10a shows the maximum $S_3$ of the state of polarization emerging from the structure over 0°~85° incident angles and 0°~360° azimuth of incident plane when the linear polarizer is modeled as uniaxial absorptive material, of which the refractive indices $n_e=1.5+i\times3.251\times10^{-3}$ and $n_o=1.5+i\times2.86\times10^{-3}$. The structure in FIG. 9 is applicable to left-hand circular polarizer as FIG. 10b shows. For the left-handed circular polarizer, the slow axis of the uniaxial A-plate films is negative of that of the A-plate films in the right-handed circular polarizer in FIG. 9. The incident angle is between approximately 0° and approximately 85° and the azimuth of incident plane is between approximately 0° and approximately 360° with respect to the transmission axis of the polarizer. The difference between the $S_3$ of the expected circular state of polarization and the $S_3$ of the state of polarization emerging from the structure is less than 0.005 over the approximately 0° and approximately 85° incident angle and approximately 0° and approximately 360° azimuth of incident plane between the 450 nm ~650 nm spectrum of the incident light. The produced state of polarization emerging from the structure shown in FIG. 9 is achromatic.

Second Embodiment

Figure 11:
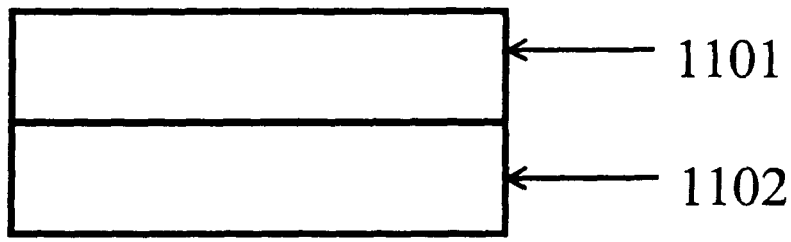
FIG. 11 shows an example of the circular polarizer structure according to a second embodiment of the present invention.

The structure of the wide-acceptance-angle circular polarizer of the second embodiment is shown in FIG. 11 with one biaxial phase retardation film. Biaxial phase retardation film is an optical component that is made of biaxial anisotropic media with its optical axis either parallel to or perpendicular to the polarizer-retarder surface. The structure comprises optical components along the propagation direction of light, beginning with a polarizing film 1101 producing linear state of polarization, followed by one biaxial phase retardation film 1102, of which the slow axis on the plane parallel to the polarizer-retarder surface is ±(30°~60°) with respect to the transmission direction of the linear polarizer. For the biaxial phase retardation film, the phase retardation on the plane parallel to the polarizer-retarder surface satisfies condition d·Δn=±(0.05λ~3.5λ), and the phase retardation perpendicular to the polarizer-retarder surface satisfies condition d·Δn=±(0.05λ~3.5λ). In the normal incident case, for the biaxial phase retardation film, the phase retardation perpendicular to the polarizer-retarder surface is zero.

In this example, the emerging state of polarization depends on the phase retardation parallel to the polarizer-retarder surface and the angle between the slow axis of the biaxial phase retardation film and the transmission axis of polarizer. In this example, the emerging state of polarization is almost circular. In the oblique incident case, the difference between the expected circular state of polarization and the state of polarization emerging from the structure is reduced by the phase retardation of the biaxial phase retardation film.

Therefore, over wide-acceptance angles, the difference between the $S_3$ of the expected circular state of polarization and the $S_3$ of the state of polarization emerging from the structure is much smaller than that of a conventional circular polarizer. At the same time, the structure shown in FIG. 11 has the advantages of simple structure, easy fabrication and low cost.

Figure 12:
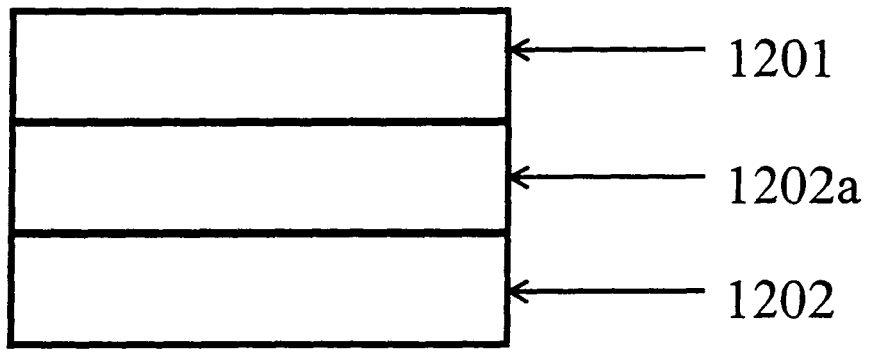
FIG. 12 shows another example of the circular polarizer structure of the second embodiment of the present invention.

FIG. 12 shows another example of the second embodiment, wherein the structure of the wide-acceptance-angle circular polarizer includes more than one biaxial phase retardation film. As shown, the structure includes optical components along the propagation direction of light, beginning with a polarizing film 1201 producing linear state of polarization, followed by two biaxial phase retardation films 1202a and 1202b.

For the biaxial phase retardation film 1202a, the slow axis on the plane parallel to the polarizer-retarder surface is approximately ±(5°~75°) with respect to the transmission direction of the linear polarizer, the phase retardation on the plane parallel to the polarizer-retarder surface satisfies condition $d \cdot \Delta n = \pm(0.05\lambda \sim 3.5\lambda)$, and the phase retardation perpendicular to the polarizer-retarder surface satisfies condition $d \cdot \Delta n = \pm(0.05\lambda \sim 3.5\lambda)$. For the biaxial phase retardation film 1202b, the slow axis on the plane parallel to the polarizer-retarder surface is approximately ±(25°~85°) with respect to the transmission direction of the linear polarizer, the phase retardation on the plane parallel to the polarizer-retarder surface satisfies condition $d \cdot \Delta n = \pm(0.05\lambda \sim 3.5\lambda)$, and the phase retardation perpendicular to the polarizer-retarder surface satisfies condition $d \cdot \Delta n = \pm(0.05\lambda \sim 3.5\lambda)$. In the normal incident case, for the biaxial phase retardation films, the phase retardations perpendicular to the polarizer-retarder surface are zero.

The emerging state of polarization depends on the phase retardations parallel to the polarizer-retarder surface and the angles between the slow axes of the biaxial phase retardation films and the transmission axis of polarizer. In this example, the emerging state of polarization is almost circular. In the oblique incident case, the difference between the expected circular state of polarization and the state of polarization emerging from the structure is reduced by the phase retardations of the biaxial phase retardation films. Therefore, over wide-incident angles, the difference between the $S_3$ of the expected circular state of polarization and the $S_3$ of the state of polarization emerging from the structure is much smaller than that of a conventional circular polarizer.

Figure 13:
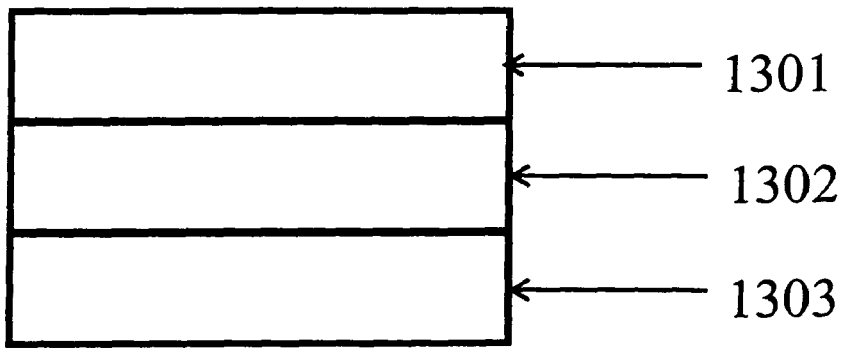
FIG. 13 shows another example of the circular polarizer structure of the second embodiment of the present invention.

FIG. 13 shows another example of the wide-acceptance-angle circular polarizer according to the second embodiment. In this example, the structures of the wide-acceptance-angle circular polarizer consisting of one biaxial phase retardation film and one uniaxial A-plate phase retardation film. The structure shown in FIG. 13 is comprises optical components along the propagation direction of light, beginning with a polarizing film 1301 producing linear state of polarization, followed by one uniaxial A-plate phase retardation film 1302 and one biaxial phase retardation film 1303.

The displacements of the uniaxial A-plate phase retardation film and the biaxial phase retardation film can be in any order along the propagation direction of the incident light. For the uniaxial A-plate phase retardation film 1302, the slow axis is approximately ±(5°~85°) with respect to the transmission direction of the linear polarizer and the phase retardation satisfies condition $d \cdot \Delta n = \pm(0.05\lambda \sim 3.5\lambda)$. For the biaxial phase retardation film 1303, the slow axis on the plane parallel to the polarizer-retarder surface is approximately ±(5°~85°) with respect to the transmission direction of the linear polarizer, the phase retardation on the plane parallel to the polarizer-retarder surface satisfies condition $d \cdot \Delta n = \pm(0.05\lambda \sim 3.5\lambda)$, and the phase retardation perpendicular to the polarizer-retarder surface satisfies condition $d \cdot \Delta n = \pm(0.05\lambda \sim 3.5\lambda)$. In the normal incident case, for the biaxial phase retardation film, the phase retardation perpendicular to the polarizer-retarder surface is zero.

The emerging state of polarization is almost circular. In the oblique incident case, the difference between the expected circular state of polarization and the state of polarization emerging from the structure is reduced by the phase retardations of the uniaxial A-plate phase retardation film and the biaxial phase retardation film. Therefore, over wide-acceptance angles, the difference between the $S_3$ of the expected circular state of polarization and the $S_3$ of the state of polarization emerging from the structure is much smaller than that of a conventional circular polarizer.

Figure 14:
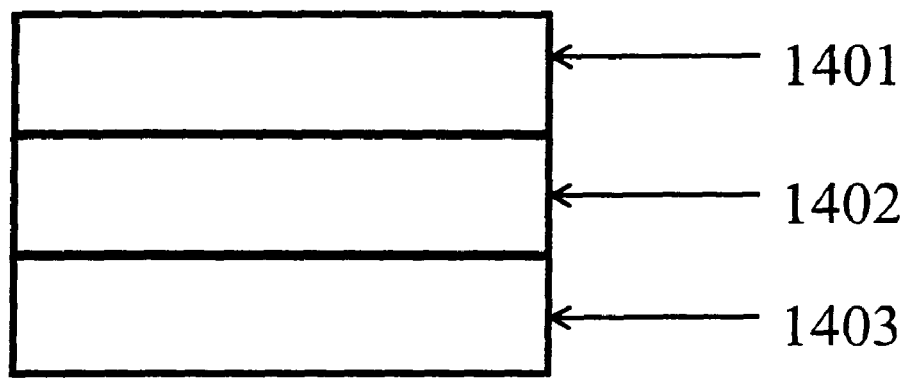
FIG. 14 shows another example of the circular polarizer structure of the second embodiment of the present invention.

FIG. 14 shows another example of the structures of the wide-acceptance-angle circular polarizer consisting of one biaxial phase retardation film and one uniaxial C-plate phase retardation film. The structure shown in FIG. 14 comprise optical components along the propagation direction of light, beginning with a polarizing film 1401 producing linear state of polarization, followed by one uniaxial C-plate phase retardation film 1402 and one biaxial phase retardation film 1403.

The displacements of the uniaxial C-plate phase retardation film and the biaxial phase retardation film can be in any order along the propagation direction of the incident light. For the uniaxial C-plate phase retardation film 1402, the phase retardation satisfies condition $d \cdot \Delta n = \pm(0.05\lambda \sim 3.5\lambda)$. For the biaxial phase retardation film 1403, the slow axis on the plane parallel to the polarizer-retarder surface is ±(5°~85°) with respect to the transmission direction of the linear polarizer, the phase retardation on the plane parallel to the polarizer-retarder surface satisfies condition $d \cdot \Delta n = \pm(0.05\lambda \sim 3.5\lambda)$, and the phase retardation perpendicular to the polarizer-retarder surface satisfies condition $d \cdot \Delta n = \pm(0.05\lambda \sim 3.5\lambda)$. In the normal incident case, for the biaxial phase retardation film and the uniaxial C-plate phase retardation film, the phase retardations perpendicular to the polarizer-retarder surface are zero.

The emerging state of polarization in this example is almost circular. In the oblique incident case, the difference between the expected circular state of polarization and the state of polarization emerging from the structure is reduced by the phase retardations of the uniaxial C-plate phase retardation film and the biaxial phase retardation film. Therefore, over wide-acceptance angles, the difference between the $S_3$ of the expected circular state of polarization and the $S_3$ of the state of polarization emerging from the structure is much smaller than that of a conventional circular polarizer.

Figure 15:
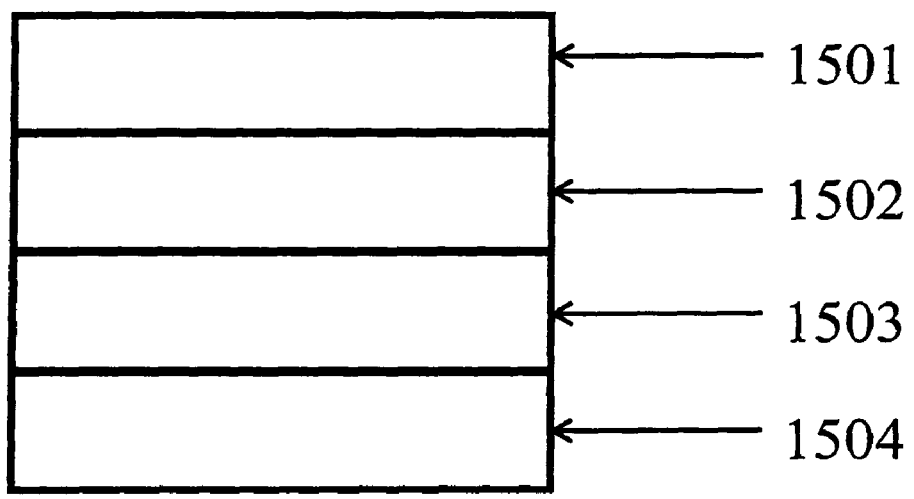
FIG. 15 shows another example of the circular polarizer structure of the second embodiment of the present invention.

FIG. 15 shows the structures of the proposed wide-acceptance-angle circular polarizer includes of one biaxial phase retardation film, one uniaxial A-plate phase retardation film and one uniaxial C-plate phase retardation film. The structures shown in FIG. 15 consist of optical components along the propagation direction of light, beginning with a polarizing film 1501 producing linear state of polarization, followed by one uniaxial A-plate phase retardation film 1502, one uniaxial C-plate phase retardation film 1503, and one biaxial phase retardation film 1504.

The displacements of the uniaxial A-plate phase retardation film, the uniaxial C-plate phase retardation film, and the biaxial phase retardation film can be in any order along the propagation direction of the incident light. For the uniaxial A-plate phase retardation film 1502, the slow axis is approximately ±(5°~75°) with respect to the transmission direction of the linear polarizer and the phase retardation satisfies condition $d \cdot \Delta n = \pm(0.05\lambda \sim 3.5\lambda)$. For the uniaxial C-plate phase retardation film 1503, the phase retardation satisfies condition $d \cdot \Delta n = \pm(0.05\lambda \sim 3.5\lambda)$. For the biaxial phase retardation film 1504, the slow axis on the plane parallel to the polarizer-retarder surface is approximately ±(25°~85°) with respect to the transmission direction of the linear polarizer, the phase retardation on the plane parallel to the polarizer-retarder surface satisfies condition d·Δn=±(0.05λ~3.5λ), and the phase retardation perpendicular to the polarizer-retarder surface satisfies condition d·Δn=±(0.05λ~3.5λ). In the normal incident case, for the biaxial phase retardation film and the uniaxial C-plate phase retardation film, the phase retardations perpendicular to the polarizer-retarder surface are zero.

As in the previous example, the emerging state of polarization is almost circular. In the oblique incident case, the difference between the expected circular state of polarization and the state of polarization emerging from the structure is reduced by the phase retardations of the uniaxial A-plate phase retardation film, the uniaxial C-plate phase retardation film, and the biaxial phase retardation film. Therefore, over wide-acceptance angles, the difference between the $S_3$ of the expected circular state of polarization and the $S_3$ of the state of polarization emerging from the structure is much smaller than that of a conventional circular polarizer.

Figure 16:
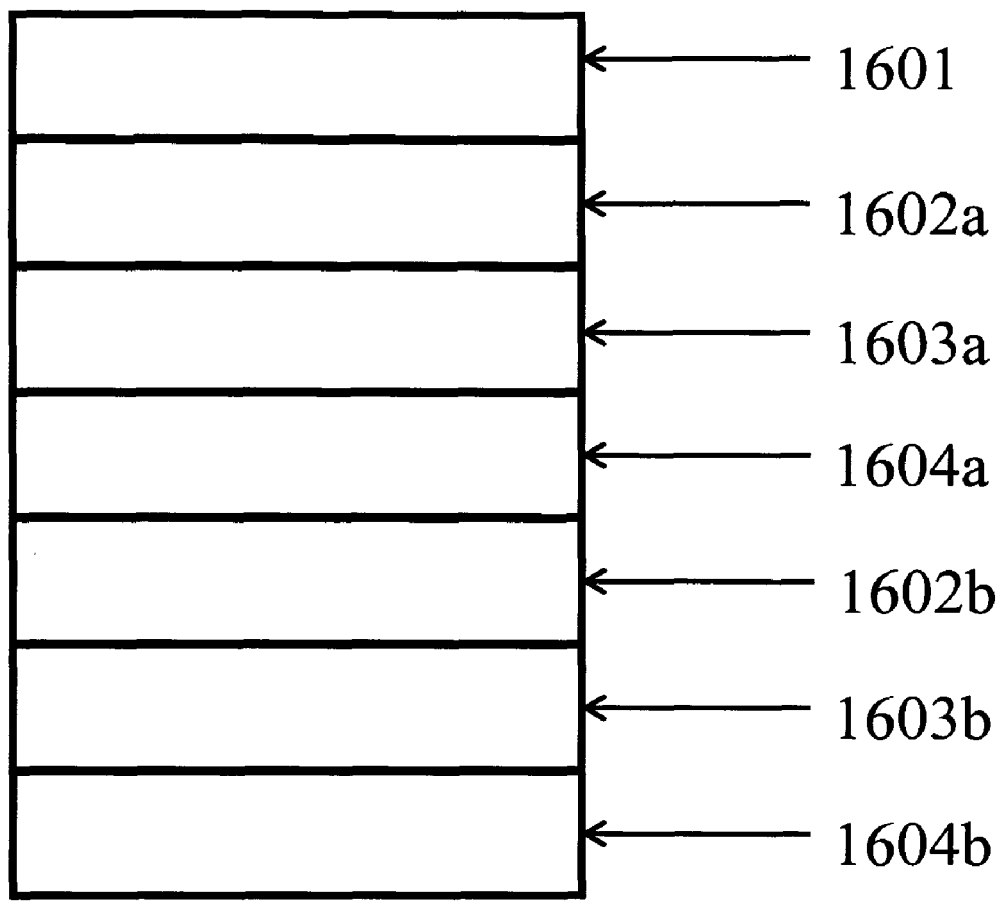
FIG. 16 shows yet another example of the circular polarizer structure of the second embodiment of the present invention.

FIG. 16 shows the structure a yet another example of the wide-acceptance-angle circular polarizer according to the second embodiment. In this example, wide-acceptance-angle circular polarizer includes a combination of more than one biaxial phase retardation films, more than one uniaxial A-plate phase retardation films and more than one uniaxial C-plate phase retardation films. The structure shown in FIG. 16 consists of optical components along the propagation direction of light, beginning with a polarizing film 1601 producing linear state of polarization, followed by two uniaxial A-plate phase retardation films 1602a and 1602b, two uniaxial C-plate phase retardation films 1603a and 1603b, and two biaxial phase retardation films 1604a and 1604b.

The displacements of the uniaxial A-plate phase retardation films, the uniaxial C-plate phase retardation films, and the biaxial phase retardation films can be in any order along the propagation direction of the incident light. For the uniaxial A-plate phase retardation film 1602a, the slow axis is ±(0.1°~89.9°) with respect to the transmission direction of the linear polarizer and the phase retardation satisfies condition d·Δn=±(0.05λ~3.5λ). For the uniaxial C-plate phase 1603a, the phase retardation satisfies condition d·Δn=±(0.05λ~3.5λ). For the biaxial phase retardation film 1604a, the slow axis on the plane parallel to the polarizer-retarder surface is ±(0.1°~89.9°) with respect to the transmission direction of the linear polarizer, the phase retardation on the plane parallel to the polarizer-retarder surface satisfies condition d·Δn=±(0.05λ~3.5λ), and the phase retardation perpendicular to the polarizer-retarder surface satisfies condition d·Δn=±(0.05λ~3.5λ). For the uniaxial A-plate phase retardation film 1602b, the slow axis is ±(0.1°~89.9°) with respect to the transmission direction of the linear polarizer and the phase retardation satisfies condition d·Δn=±(0.05λ~3.5λ). For the uniaxial C-plate phase retardation film 1603b, the phase retardation satisfies condition d·Δn=±(0.05λ~3.5λ). For the biaxial phase retardation film 1604b, the slow axis on the plane parallel to the polarizer-retarder surface is approximately ±(0.1°~89.9°) with respect to the transmission direction of the linear polarizer, the phase retardation on the plane parallel to the polarizer-retarder surface satisfies condition d·Δn=±(0.05λ~3.5λ), and the phase retardation perpendicular to the polarizer-retarder surface satisfies condition d·Δn=±(0.05λ~3.5λ). In the normal incident case, for the biaxial phase retardation films and the uniaxial C-plate phase retardation films, the phase retardations perpendicular to the polarizer-retarder surface are zero.

Again, the emerging state of polarization is approximately circular. In the oblique incident case, the difference between the expected circular state of polarization and the state of polarization emerging from the structure is reduced by the phase retardations of the uniaxial A-plate phase retardation films, the uniaxial C-plate phase retardation films, and the biaxial phase retardation films. Therefore, over wide-acceptance angles, the difference between the $S_3$ of the expected circular state of polarization and the $S_3$ of the state of polarization emerging from the structure is much smaller than that of conventional circular polarizer.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A circular polarizer consisting of: one single linear polarizer producing a linear state of polarization; and two biaxial phase retardation films adjacent to the one single linear polarizer forming the circular polarizer, the circular polarizer not including a liquid crystal material, wherein said at least one biaxial phase retardation film adjacent to the one single linear polarizer comprises: a slow axis on the plane parallel to a polarizer-retarder surface of said at least one biaxial phase retardation film between one of approximately +0.1° to approximately +2.1° and approximately −0.1° to approximately −2.1° with respect to the transmission direction of the said linear polarizer; and a phase retardation on the plane parallel to the polarizer-retarder surface of approximately d·Δn=±(0.47λ~0.49λ); and a phase retardation on the plane perpendicular to the polarizer-retarder surface of approximately d·Δn=±(0.35λ~0.37λ) where λ is the wave length of incident light.

2. A circular polarizer consisting of: one single linear polarizer producing a linear state of polarization; and two biaxial phase retardation films adjacent to the one single linear polarizer forming the circular polarizer, the circular polarizer not including a liquid crystal material, wherein said at least one biaxial phase retardation film away from the one single linear polarizer comprises: a slow axis on the plane parallel to a polarizer-retarder surface of said at least one biaxial phase retardation film between one of approximately +45.1° to approximately +47.1° and approximately −45.1° to approximately −47.1° with respect to the transmission direction of the said linear polarizer; and a phase retardation on the plane parallel to the polarizer-retarder surface of approximately d·Δn=±(0.241λ~0.248λ); and a phase retardation on the plane perpendicular to the polarizer-retarder surface of approximately d·Δn=±(0.126λ~0.139λ) where λ, is the wave length of incident light.

* * * * *